(12) United States Patent
Kesavan et al.

(10) Patent No.: US 11,940,365 B1
(45) Date of Patent: Mar. 26, 2024

(54) PASSIVE OUTDOOR AEROSOL SAMPLER DEVICE

(71) Applicant: U.S. Army Combat Capabilities Development Command, Chemical Biological Center, Apg, MD (US)

(72) Inventors: Jana S Kesavan, Catonsville, MD (US); Jerold R Bottiger, Aberdeen, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 253 days.

(21) Appl. No.: 17/558,275

(22) Filed: Dec. 21, 2021

(51) Int. Cl.
*G01N 15/06* (2006.01)
*G01N 1/22* (2006.01)
*B01D 46/00* (2022.01)
*F24F 8/10* (2021.01)

(52) U.S. Cl.
CPC ....... *G01N 15/0606* (2013.01); *G01N 1/2202* (2013.01); *G01N 1/2273* (2013.01); *B01D 46/0086* (2013.01); *F24F 8/10* (2021.01); *G01N 2001/2223* (2013.01)

(58) Field of Classification Search
CPC ...... G01N 1/22; G01N 1/2202; G01N 1/2205; G01N 2001/222; G01N 2001/2223; G01N 1/2273; G01N 15/0606
See application file for complete search history.

(56) References Cited

U.S. PATENT DOCUMENTS

| 3,645,694 A * | 2/1972 | Flatau | G01N 1/2214 |
| | | | 416/197 R |
| 10,775,279 B1 * | 9/2020 | Kesavan | G01N 1/2205 |
| 2009/0200458 A1 * | 8/2009 | Kashima | G01N 1/4022 |
| | | | 250/281 |
| 2012/0222500 A1 * | 9/2012 | Riess | G01N 1/405 |
| | | | 73/863.23 |
| 2018/0266922 A1 * | 9/2018 | Therkorn | G01N 1/26 |

\* cited by examiner

*Primary Examiner* — Benjamin R Schmitt
(74) *Attorney, Agent, or Firm* — Ulysses John Biffoni; Timothy M. Barlow

(57) ABSTRACT

The present invention is directed to a passive outdoor air sampler device with various screen types and materials for efficient collection of air particles. Screens are used as a collection surface for aerosolized particles. The air sampler is suitable for long-term use in different outdoor settings with no power requirements.

14 Claims, 5 Drawing Sheets

PASSIVE OUTDOOR AEROSOL SAMPLER DEVICE

GOVERNMENT INTEREST

The invention described herein may be manufactured, used, and licensed by or for the United States Government.

FIELD OF THE INVENTION

The present disclosure relates generally to passive outdoor aerosol samplers for long-term use in collecting biological and non-biological air particles.

BACKGROUND OF THE INVENTION

It is important to collect and analyze particles in outdoor air to determine the particle composition and concentration. This information may indicate the origin of particles and the distance these particles travel. Knowledge of the background aerosol composition and concentration and the change in composition and concentration over time will inform researchers when unusual activities occur.

Devices and methods for collecting outdoor particulate matter in air are highly useful in a wide variety of applications, especially those in which there are public health concerns related to air quality. For example, large molecular polycyclic aromatic hydrocarbons ("PAHs") are ubiquitous atmospheric pollutants that are a concern due to their toxicity. Investigations of their deposition fluxes are often conducted to assess loadings to terrestrial or aquatic environments that may be at risk. A common approach for estimating deposition of large molecular PAHs and other semi-volatile, non-volatile liquid and solid air pollutants is based on sampling of ambient air.

Air sampling devices may be categorized as either active or passive air samplers. Active air samplers typically employ pumps to pass air through or over the collection surface, whereas passive air samplers typically rely on passive processes such as diffusion to sample air.

Three types of passive air samplers are commonly employed. The first, bulk deposition collectors, are continuously open collectors that collect both wet and dry deposition components. Bulk deposition collectors are prone to sampling artifacts (degradation of target analytes exposed to sunlight or revolatilization to air) and are not able to separate dry deposition from wet deposition.

Biomonitoring is a second passive sampling technique that may be employed. In this technique, biomonitors such as pine needles, mosses, and lichens are used to assess deposition. However, this method has associated sources of uncertainty that arise due to inconsistencies with biomonitors as collection substrates. Processes may degrade target analytes following their deposition on biomonitors.

Modeling techniques are a third approach to passive air sampling. Modeling techniques are an indirect approach for assessing deposition using ambient air concentration data and estimated gas- and particle-phase deposition velocities to calculate deposition fluxes. This approach requires information on wind speed, topography, particle-size distribution, and chemical particle-gas partitioning data in order to provide an estimate for deposition flux. This is a data-heavy approach that could result in high uncertainty depending on the availability of data.

One example of a commercially available passive air sampler is the TE-200 PUF passive air sampler (Tisch Environmental, herein referred to by the acronym PAS). The PAS device is a passive air sampler employing a polyurethane foam (PUF) collection media. The PAS device comprises upper and lower fitted bowls joined by a hinge on one side. An assembled PAS device adopts a double dome shape. The upper and lower fitted bowls assemble such that a gap is formed between the rims of the open ends of the two bowls. A PUF collection media is supported within the chamber formed by the fitted bowls. Air circulation may enter and exit the chamber, allowing for passive sampling of the air through exposure to the contained PUF disk.

While the PAS device is useful for a variety of passive air sampling applications, the double-dome chamber design of the PAS device inherently precludes larger depositing particles. In many applications, for example, in the case of polyaromatic hydrocarbon (PAH) sampling, larger particles dominate the dry deposition particle component and thus a passive air sampling device operating in the full size-range of depositing particles would be more desirable.

A variety of other passive air sampler devices are known in the art that employ specific sampling media.

US20190162638 to Shea et al. discloses a passive sampling membrane, comprising a continuous mesoporous sequestration media comprising a sequestration phase and a support membrane, the support membrane being configured to support the sequestration phase, wherein the sequestration phase comprises a hydrophobic region and a hydrophilic region, wherein the continuous mesoporous sequestration media is configured to simultaneously sequester polar and non-polar organic substances. Shea et al. teaches an elaborated multi-phased passive membrane, which would drastically increase production costs.

U.S. Pat. No. 9,594,006 to Harner discloses a passive air sampling device, comprising: a top cover plate; a bottom plate connected to and spaced a distance apart from the top cover plate; and at least one sampling media supported by the bottom plate and positioned within the device in an orientation accessible for collecting particles in the environment, wherein the top cover plate and the bottom plate are connected by one or more vertical spacers. Harner discloses a device without an adequate continuous outside cover and would immediately be overcome or contaminated by leaves or large debris.

Therefore, currently, there are no cost-effective, efficient, long term, and passive aerosol samplers available for use. Active aerosol samplers are available but require AC or battery power. Battery power limits the sampling duration and AC power may not be available in some outdoor locations. Thus, there is a need for a cost-effective, efficient, long term, and outdoor, and passive aerosol sampler to overcome these challenges and capture particles in the air for analysis.

SUMMARY OF THE INVENTION

The purpose of the invention is to provide an outdoor aerosol sampler for that is capable of passively collecting air particles. An object of the invention is to overcome or to eliminate the requirement of power or batteries to operate, such as those found in active aerosol samplers. Another object of the invention is to provide a cost-effective, passive outdoor aerosol sampler that is suitable for long-term use. Yet another object of the invention is an outdoor aerosol sample that efficiently collects particles in any outdoor environment (e.g., very hot or very cold temperatures). In particular, "passive" excludes the use of electricity to power the device. The present invention is a low pressure drop device that allows air to pass through the screens that collect particles.

In an embodiment of the invention, the outdoor air sampler contains one or more screens capable of collecting air particles: an air particle collection screen. The sampler may contain multiple collection screens oriented throughout a base.

In an embodiment of the invention, the outdoor air sampler passively collects air particles.

In an embodiment of the invention, air particle collection screens may be of various shapes, such as a square, rectangle, a hollow cylinder or a spiral shape formed from a material spiraling out from an inner center point.

In an embodiment of the invention, the air particle collection screen may be made of various materials, such as wire mesh. The screen may also be framed. The screens may comprise synthetic fiber.

In an embodiment of the invention, the air sampler may further comprise: (a) an attachment means for placing the sampler outdoors; (b) a continuous outer housing surrounding the collection screen; (c) a base; and (d) an upper cover protecting the collection screen. The attachment means may be a clip or hook. The outer housing prevents debris from entering the sampler. The outer housing may be wire mesh with an aperture larger than the collection screens. The upper cover of the sampler may be a covering, such as a rain hat, that prevents rain from entering the sampler.

In an embodiment of the invention, the upper cover and the base are spaced apart in parallel. The collection screens are located within the space between the upper cover and the base. In one embodiment of the invention, the collection screen is affix within the space between the upper cover and the base. In another embodiment, the collection screen is attached to the base. In another embodiment, the collection screen is attached to the rain cover.

In an embodiment of the invention, the upper cover and base are connected by the outer housing. In another embodiment of the invention, the upper cover and base are connected by a vertical means of support within the space between the cover and base. The vertical means of support are perpendicular to the horizontal line of the cover and base. The vertical means of support may either be located within, or on the outside border of the space between the cover and base.

DETAILED DESCRIPTION OF THE INVENTION

The present invention relates to an outdoor air sampler that passively collects air particles on screens (aerosolized particles). One or more screens of various shape, size and orientation are used as a collection surface for particles in air. Air passes through the screen and particles are collected on the screen via impaction, interception, diffusion, and/or electrostatic attraction.

The screen mesh wires are made of, but not limited to, material selected from the group consisting of carbon steel, galvanized steel, stainless steel, aluminum, and mixtures thereof. The screen wires/mesh may also be made of synthetic fibers. The thickness of the screen wires and screen aperture may vary to optimize for higher particle collection. The screen may also be charged for increased collection, for example, a small battery can be placed under the rain hat or the base and connected to the screens to charge them positively or negatively to increase the particle collection efficiency. A higher voltage battery is preferred. The screen may be coated with mineral oil, Tween 20, or other material for increased stickiness, increased collection, and may be optimized to prevent the decay of biomaterials collected.

The outdoor sampler may be any shape and size. An outer housing with larger holes may surround the screens to prevent debris, such as bugs and leaves, from entering the sampler while still allowing particles of interest to enter. An upper cover, such as a rain hat, may be used to protect the sampler from the rain. The sampler may be attached or hung from a tree branch or a post using any attachment means, such as a clip or hook.

Figure 1:
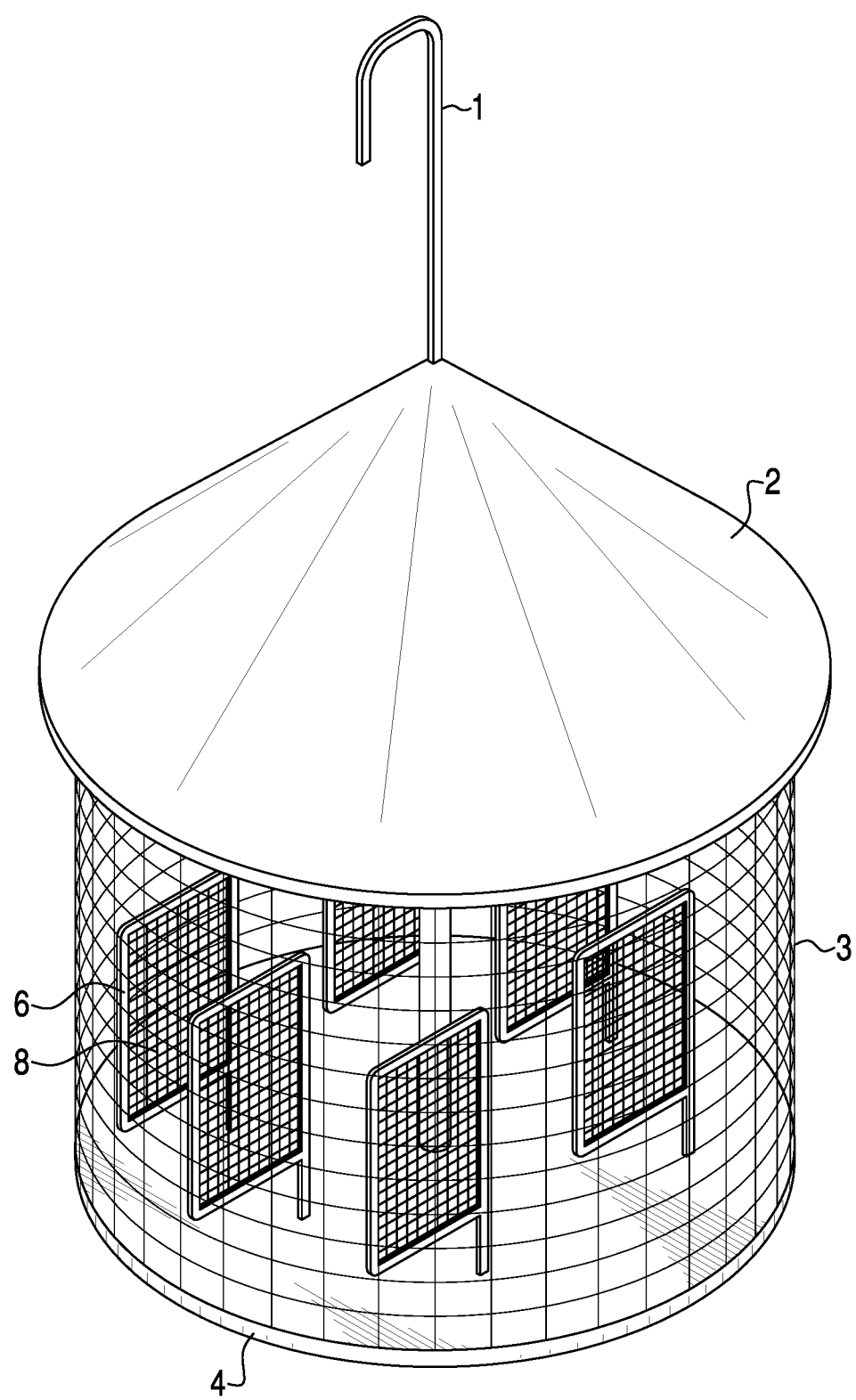
FIG. 1 illustrates an embodiment of an outdoor air sampler with multiple screens.

FIG. 1 shows an embodiment of the invention: an outdoor sampler with multiple screens. The outdoor sampler is shown with an upper cover or rain hat 2 to prevent rain from entering the sampler; a clip or hook attachment 1 for placement on a tree branch or post or attachment to vehicles; an outer layer or housing 3 that allows air particles to enter the sampler but prevents bugs, leaves and debris from entering; and a base 4. In this embodiment, multiple rectangular wire mesh air particle collection screens 8 attached to frames 6 are placed inside the sampler on the base. The screens are spaced out and oriented throughout the base.

Figure 2:
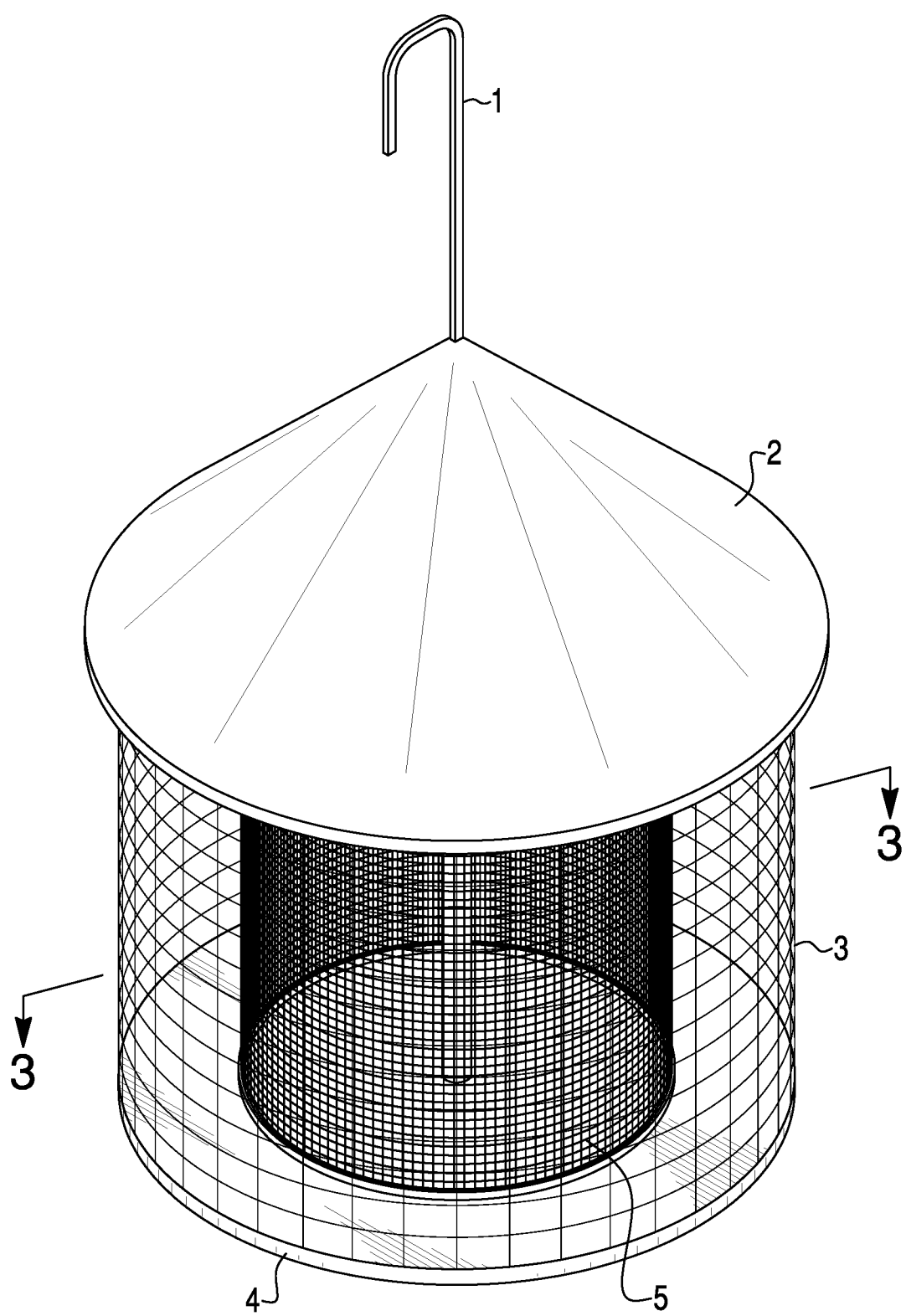
FIG. 2 illustrates an embodiment of an outdoor air sampler with a cylinder screen.

FIG. 2 shows another embodiment of the invention with a cylindrical screen 5. This embodiment contains similar parts as shown in FIG. 1. The outdoor sampler is shown with an upper cover or rain hat 2; a clip or hook attachment 1; an outer layer or housing 3, and a base 4. In this embodiment, a cylindrical screen 5 is disposed within the housing 3. Alternatively, the cylinder-shaped screen may be formed from an outward spiral of the wire mesh screen material.

Figure 3:
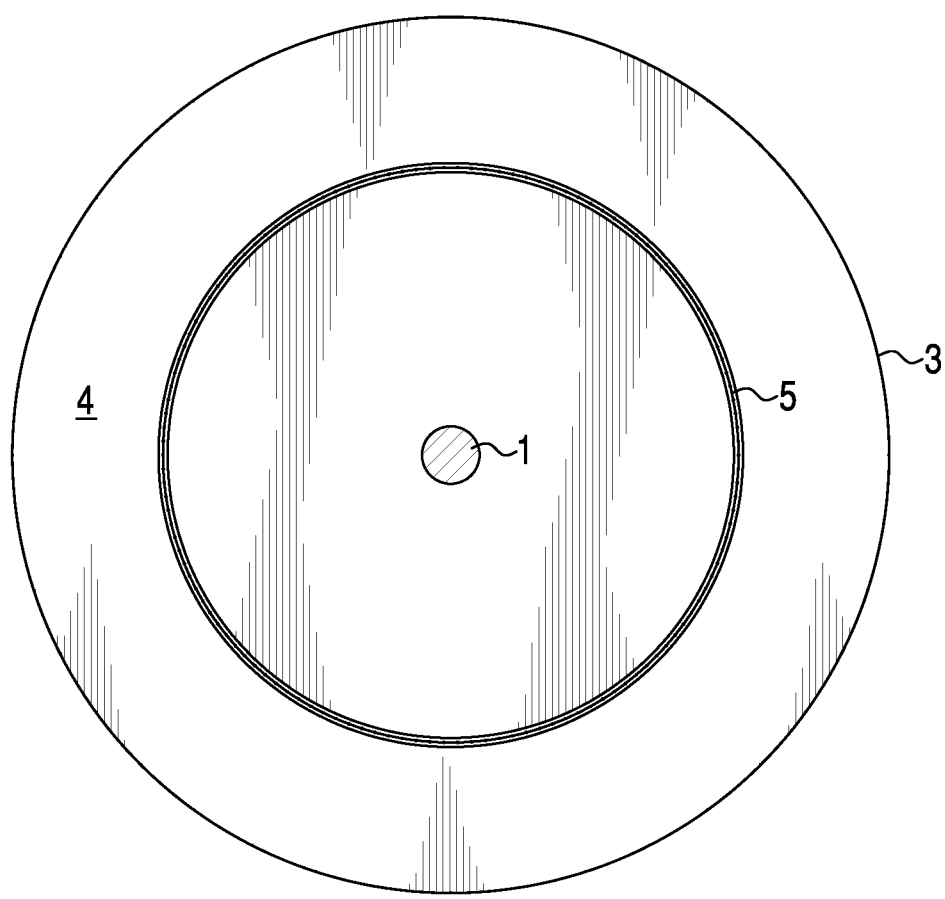
FIG. 3 illustrates a top view of the embodiment in FIG. 2: an outdoor air sampler with a cylinder screen.

FIG. 3 shows a top view of an embodiment of an outdoor air sampler, looking down from the above without an upper cover or rain hat. This view shows a cylindrical screen 5, base 4 and outer layer or housing 3.

Figure 4:
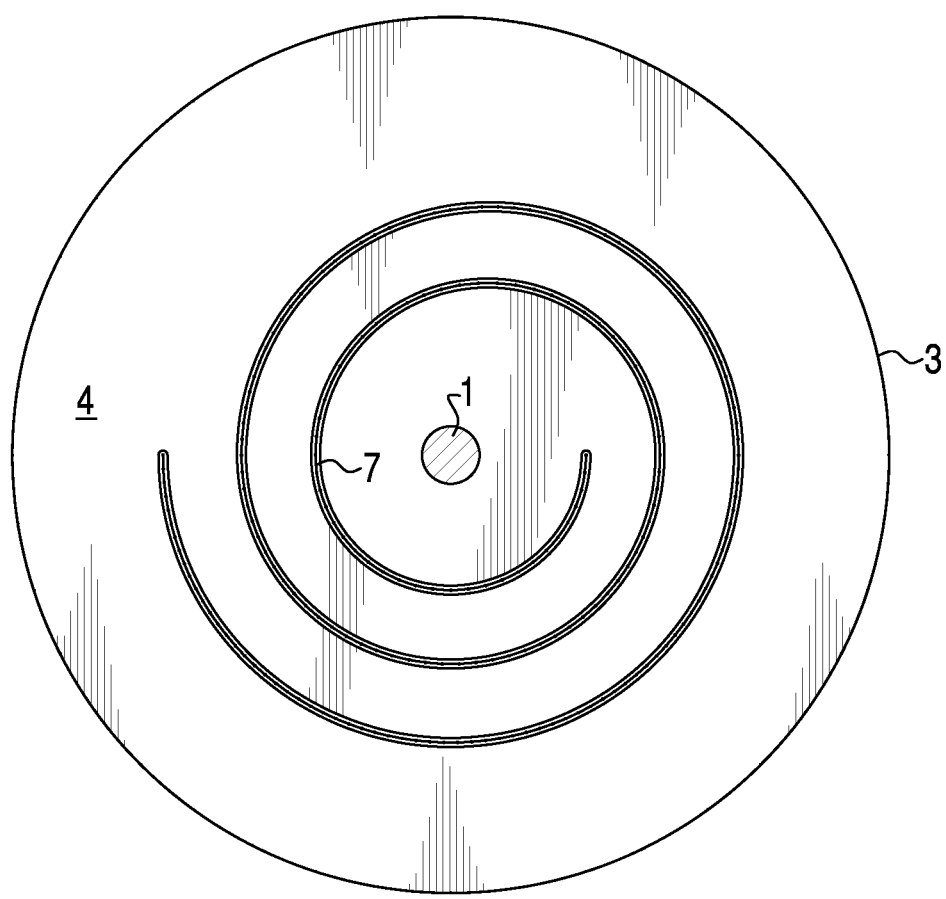
FIG. 4 illustrates a top view of another embodiment of an outdoor air sampler of FIG. 2 with a spiral cylindrical screen.

FIG. 4 shows a top view of another embodiment of an outdoor air sampler. Looking down from above without an upper cover, this embodiment shows a spiral-shaped screen 7 formed by a wire mesh material spiraling out from the center. Also shown is base 4 and outer layer or housing 3.

Figure 5:
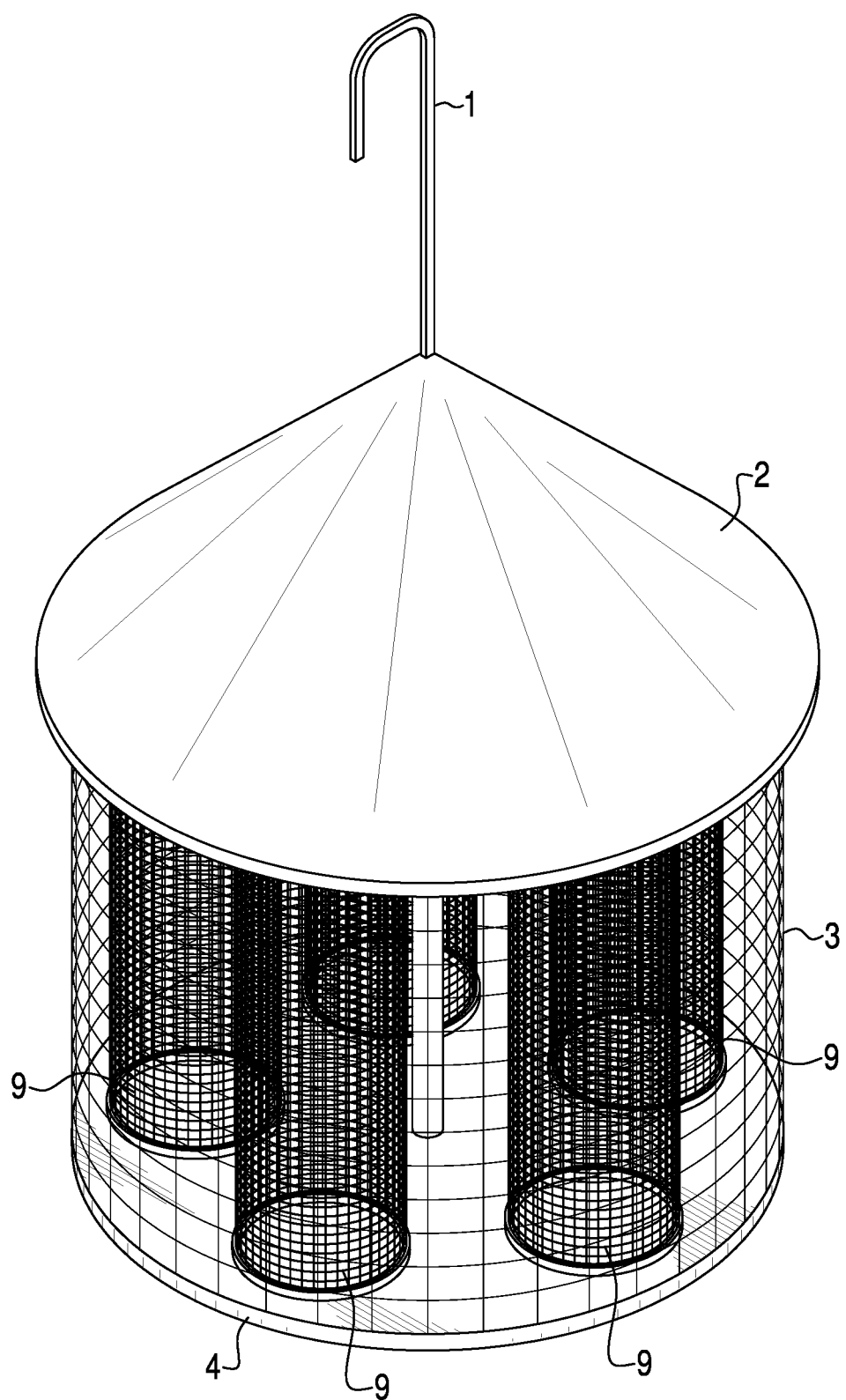
FIG. 5 illustrates an embodiment of an outdoor air sampler with multiple cylinder screens.

FIG. 5 shows yet another embodiment of the invention with multiple cylindrical screens 9. The outdoor sampler is shown with an upper cover or rain hat 2; a clip or hook attachment 1; an outer layer or housing 3; a base 4; and multiple cylindrical screens 9 placed on and throughout the base. Alternatively, the multiple cylindrical screens 9 may be multiple spiral-shaped screens formed from a wire mesh spiraling outwards from a center point.

Example(s)

Example 1

Outdoor Air Sampler with Multiple 1" by 1.25" Wire Mesh Screens

FIG. 1 shows an outdoor air sampler with multiple wire mesh screens. Sampling efficiency tests were conducted with different screens. The screen frames were 1" by 1.25". Tests were conducted with 3.39 micron mass median diameter particles and the efficiency was calculated by comparing the amount of particles collected by the passive sampler to an active filter based sampler with an airflow rate of 1 liter per minute (lpm). The sampling efficiency results are shown in Table 1 as follows:

TABLE 1

| Mesh [Openings in a square inch] | Wire Diameter (inch) | Sampling Efficiency |
|---|---|---|
| 24 × 24 | 0.014 | 7.9% |
| 50 × 50 | 0.009 | 8.1% |
| 100 × 100 | 0.0045 | 7.3% |
| 150 × 150 | 0.0026 | 7.7% |
| 200 × 200 | 0.0016 | 5.7% |

Example 2

Outdoor Air Sampler with Multiple 1" by 1.25" Screen Frames Wrapped with Synthetic Fiber A sampling efficiency test was also conducted on an outdoor air sampler shown in FIG. 1, with 1" by 1.25" screen frames wrapped with synthetic fiber. The sampling efficiency test results indicates that the synthetic fibers collected 4.4% of the particles in the air.

Example 3

Outdoor Air Sampler with Multiple Cylindrical Screens

FIG. 5 shows an outdoor air sampler with multiple wired mesh screens rolled as cylinders. Mesh screens 2"×3" rectangles were rolled as cylinders and arranged as shown in FIG. 5. Sampling efficiency tests were conducted for 3.8 micron particles. The results are shown in Table 2 as follows:

TABLE 2

| Mesh [Openings in a square inch] | Wire Diameter (inch) | Sampling Efficiency |
|---|---|---|
| 24 × 24 | 0.014 | 15.3% |
| 50 × 50 | 0.009 | 10.5% |
| 100 × 100 | 0.0045 | 10.4% |

References and citations to other documents, such as patents, patent applications, patent publications, journals, books, papers, web contents, have been made throughout this disclosure. All such documents are hereby incorporated herein by reference in their entirety for all purposes.

The invention claimed is:

1. A passive air sampler, comprising:

at least one air particle collection screen or material;

a continuous outer housing surrounding the at least one air particle collection screen that allows aerosol particles to enter the sampler;

a base connected to the outer housing; and an upper cover connected to the outer housing at an end opposite the base and protecting the at least one air particle collection screen, wherein the at least one air particle collection screen is comprised of wire mesh, wherein the wire mesh material is selected from the group consisting of carbon steel, galvanized steel, aluminum, and mixtures thereof.

2. The passive air sampler of claim 1, wherein the at least one air particle collection screen is rectangular, and wherein each of the rectangular particle collection screens is attached to a rectangular frame and attached to the base of the outer housing by a single support along an edge of each rectangular frame.

3. The passive air sampler of claim 2, further comprising a rectangular wire mesh having between 24×24 and 200×200 openings per square inch, wherein the sampling efficiency of the sampler for 3.39 micron size particles is 5.7% or greater.

4. The passive air sampler of claim 1, wherein the at least one air particle collection screen is cylindrical.

5. The passive air sampler of claim 4, further comprising a cylindrical wire mesh having between 24×24 and 100×100 openings per square inch, wherein the sampling efficiency of the sampler for 3.8 micron size particles is greater than 10%.

6. The passive air sampler of claim 1, wherein the at least one air particle collection screen is spiral-shaped.

7. The passive air sampler of claim 1, wherein the sampler comprises multiple air particle collection screens.

8. The passive air sampler of claim 1, wherein the at least one air particle collection screen is coated with mineral oil.

9. The passive air sampler of claim 1, wherein the upper cover is a rain hat that prevents rain from entering the passive air sampler.

10. The passive air sampler of claim 1, wherein the passive air sampler further comprises an attachment for placing or hanging the passive air sampler outdoors.

11. The passive air sampler of claim 10, wherein the attachment comprises a clip or hook.

12. The passive air sampler of claim 1, wherein the continuous outer housing prevents debris from entering the sampler.

13. The passive air sampler of claim 1, wherein the at least one air particle collection screen comprises a frame surrounding a mesh.

14. The passive air sampler of claim 1, wherein the at least one air particle collection screen is attached to the base.

* * * * *